United States Patent
De Sutter

(10) Patent No.: US 12,110,565 B2
(45) Date of Patent: Oct. 8, 2024

(54) PROCEDURE FOR HARDENING SLIDES OF A PERFORATING PRESS AND THE SLIDES OBTAINED

(71) Applicant: Soenen Technology NV, Roeselare (BE)

(72) Inventor: Luc De Sutter, Roeselare (BE)

(73) Assignee: Soenen Technology NV, Roeselare (BE)

( * ) Notice: Subject to any disclaimer, the term of this patent is extended or adjusted under 35 U.S.C. 154(b) by 29 days.

(21) Appl. No.: 18/061,782

(22) Filed: Dec. 5, 2022

(65) Prior Publication Data
US 2023/0175089 A1 Jun. 8, 2023

(30) Foreign Application Priority Data
Dec. 6, 2021 (BE) .................................. 2021/5943

(51) Int. Cl.

| | |
|---|---|
| C21D 9/00 | (2006.01) |
| B23F 1/06 | (2006.01) |
| C21D 1/18 | (2006.01) |
| C21D 1/42 | (2006.01) |
| C21D 1/773 | (2006.01) |
| C21D 8/00 | (2006.01) |
| C22C 38/02 | (2006.01) |
| C22C 38/04 | (2006.01) |
| C22C 38/22 | (2006.01) |
| C22C 38/24 | (2006.01) |

(52) U.S. Cl.
CPC .............. *C21D 9/0068* (2013.01); *B23F 1/06* (2013.01); *C21D 1/18* (2013.01); *C21D 1/42* (2013.01); *C21D 1/773* (2013.01); *C21D 8/005* (2013.01); *C22C 38/02* (2013.01); *C22C 38/04* (2013.01); *C22C 38/22* (2013.01); *C22C 38/24* (2013.01); *C21D 2211/001* (2013.01)

(58) Field of Classification Search
None
See application file for complete search history.

(56) References Cited

U.S. PATENT DOCUMENTS

2015/0091225 A1 * 4/2015 Wilson ..................... C21D 9/02
148/575

* cited by examiner

*Primary Examiner* — Anthony M Liang
(74) *Attorney, Agent, or Firm* — Vorys, Sater, Seymour and Pease LLP

(57) ABSTRACT

The present invention relates to a method of hardening slides of a perforating press comprising providing a steel beam; hardening of the steel beam in a vacuum furnace; tempering the steel beam twice; first straightening of the steel beam at a temperature of 20° C.±10° C.; milling of an at least partially continuous sawtooth profile, along a longitudinal direction of the steel beam, on a first side of the steel beam; wherein, after milling the at least partially continuous sawtooth profile on the first side of the steel beam, a second side of the steel beam, lying opposite the first side, is hardened by means of induction currents, after which the steel beam is again tempered twice and after which the steel beam is straightened a second time at a temperature of 20° C.±10° C. The invention also relates to a slide for a perforating press hardened according to the method.

13 Claims, No Drawings

PROCEDURE FOR HARDENING SLIDES OF A PERFORATING PRESS AND THE SLIDES OBTAINED

TECHNICAL FIELD

The invention relates to a method of hardening slides for a perforating press and hardened slides for a perforating press.

PRIOR ART

The use of slides in perforating presses is known in the art. Slides are beam-shaped steel elements with a sawtooth profile on one side. By aligning two slides with their sawtooth profile towards each other and placing them on top of each other, it is possible to achieve a different height for the assembly of the two slides by sliding the two slides relative to each other along their longitudinal direction. This principle is used to strike or not strike a punch of a perforating press and thereby perforate a metal sheet.

Striking a punch is done with great force. It is therefore necessary that the sawtooth profiles of the two slides are accurately finished and that the slides are hardened. Furthermore, a slide experiences a large local pressure at the point where it makes contact with a stamp, in addition to a hammer effect. According to the prior art, a slide is reinforced on the side of the punches by applying a hardened strip. The hardened strip is bolted to the slide.

This known method of reinforcing a slide has the disadvantage that holes must be drilled in the slide to fix the hardened strip to the slide. These holes locally weaken the slide, so that when perforating a metal plate, a slide sometimes breaks at the level of such a drill hole. The bolts themselves also experience great forces and occasionally break, causing the hardened strip to come loose from the slide and causing damage to the hardened strip, the slide and/or the punches.

The aim of the invention is to provide a method which eliminates these disadvantages.

SUMMARY OF THE INVENTION

To this end, the invention provides a method of hardening slides of a perforating press comprising: providing a steel beam; hardening of the steel beam in a vacuum furnace; tempering the steel beam twice; first straightening of the steel beam at a temperature of 20° C.±10° C.; milling of an at least partially continuous sawtooth profile, along a longitudinal direction of the steel beam, on a first side of the steel beam; wherein after milling the at least partially continuous sawtooth profile on the first side of the steel beam, a second side of the steel beam, lying opposite the first side, is hardened by means of induction currents, after which the steel beam is again tempered twice and after which the steel beam is straightened a second time at a temperature of 20° C.±10° C.

The advantage of this method is that a slide on the second side, lying opposite the first side comprising the at least partially continuous sawtooth profile, is additionally hardened locally by means of induction currents, after which the steel beam is tempered twice again. The second side is the side of a slide that contacts a punch. Due to the additional hardening by means of induction currents, the slide on this second side is sufficiently hard to withstand large local pressures and a hammer effect when the punch is struck. It is not necessary to reinforce the slide on the second side with a hardened strip. As a result, it is also not necessary to drill holes in the slide, so that the slide is not locally weakened, and the slide has a much smaller chance of breakage when perforating a metal plate.

Preferred embodiments of the method are set out in claims 2-13.

A specific preferred embodiment concerns a method according to claim 2.

In this preferred embodiment, a specific grade of steel with an optimized alloy for tool manufacturing is used. By using this steel grade, the slide is already more resistant to high local pressures and a hammer effect as standard.

In a second aspect, the present invention relates to a slide for a perforating press, comprising a beam-shaped steel body, wherein the beam-shaped steel body extends in a longitudinal direction, wherein the beam-shaped steel body comprises on a first side an at least partially continuous sawtooth profile according to a longitudinal direction of the steel beam, wherein the slide has been hardened by a method.

This slide has the advantage, among other things, that the slide is additionally hardened and then tempered twice on a second side, with which the slide comes into contact with a punch, so that the slide is sufficiently hard to withstand large local pressures and a hammer effect when the punch is struck, without having to reinforce the slide on the second side with a hardened strip. This greatly reduces the risk of the slide breaking when perforating a metal plate.

DETAILED DESCRIPTION

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise," "comprising," "consist of", "consisting of", "provided with", "include", "including", "contain", "containing", are synonyms and are inclusive or open terms that indicate the presence of what follows, and which do not exclude or prevent the presence of other components, characteristics, elements, members, steps, as known from or disclosed in the prior art.

Quoting numerical ranges by endpoints includes all integers, fractions and/or real numbers between the endpoints, these endpoints included.

In the context of this document, "hammer scale" or "mill scale" is a hard layer of iron oxides, comprising a mixture of FeO, $Fe_2O_3$ and $Fe_3O_4$, which forms after hot rolling of steel.

The hammer effect refers to effects such as metal fatigue, cracks and breaks in a slide of a perforating press, which are caused by forces and stresses in the slide when a punch is periodically struck with the slide.

Weight percent is abbreviated to wt % in this document.

Retained austenite means austenite that has not been converted into martensite during hardening of steel, after rapid cooling of the steel, but remains present in the steel as austenite. This austenite is also called residual austenite.

Toughness of a material refers to an ability to absorb energy and deform plastically without fracturing. It is defined as the area under the stress-strain curve.

In a first aspect, the invention relates to a method of hardening slides of a perforating press.

In a preferred embodiment, the method comprises the steps of:
- providing a steel beam;
- hardening of the steel beam in a vacuum furnace;
- tempering the steel beam twice;
- first time straightening of the steel beam;
- milling an at least partially continuous sawtooth profile on a first side of the steel beam;
- hardening a second side of the steel beam opposite the first side by means of induction currents, after which the steel beam is again tempered twice;
- second straightening of the steel beam.

The steel beam extends in a longitudinal direction, a width direction and a height direction. The steel beam has a largest dimension according to the longitudinal direction. This is the length of the steel beam. A slide for a perforating press comprises a beam-shaped body, making the steel beam very suitable as a raw material for a slide.

During the hardening of the steel beam in the vacuum furnace, the steel is heated and then cooled very quickly. This first creates austenite in the steel of the steel beam and then a crystal structure, martensite, due to rapid cooling. Austenite is a face-centered cubic crystal lattice in which carbon is relatively easily soluble. By dissolving an appropriate amount of carbon in steel, the hardness of steel can be increased. Preferably, the steel of the steel beam has a carbon content of at most 0.8 wt % in order to obtain maximum hardness. Martensite is a very hard microstructure in steel. Martensite has a body-centered cubic or tetragonal crystal lattice, in which carbon is less readily soluble. Due to the rapid cooling of the steel of the steel beam, the face-centered cubic lattice of austenite flips over into a body-centered cubic crystal lattice. Carbon atoms cannot diffuse in time and a deformed body-centered cubic or a body-centered tetragonal crystal lattice of martensite is created. Heating the steel beam in a vacuum furnace prevents the steel from reacting and oxidizing with, for example, oxygen. Oxidation makes surfaces of the steel beam duller and rougher. Because two slides must be able to slide over each other, a rough surface is not desirable. The surfaces show soft spots or cracks due to oxidation, making a slide more susceptible to surface fractures. Oxidation makes steel weaker.

The steel beam is preferably hardened in the vacuum furnace at a pressure of at most 300 hPa, more preferably at most 250 hPa, even more preferably at most 200 hPa and even more preferably at most 100 hPa. The steel beam is cooled using an inert gas, preferably $N_2$ gas. The inert gas is injected into the vacuum furnace at a pressure of at least 1500 hPa, preferably at a pressure of at least 1600 hPa, more preferably at a pressure of at least 1700 hPa, even more preferably at a pressure of at least 1800 hPa and even more preferably at a pressure of at least 1900 hPa. The steel beam is hardened over its entire volume during hardening in the vacuum furnace.

After hardening in the vacuum furnace, the steel beam is tempered twice. During tempering, the steel beam is heated to a temperature at least higher than 620° C. Steel contains a quantity of retained austenite after hardening that cannot be converted into martensite. Austenite has a much higher stacking fault energy than martensite, which reduces wear resistance of the steel beam. This is disadvantageous for slides that move relative to each other. In addition, retained austenite may transform to martensite upon use of the slides through shocks and impacts. Due to this transformation and an associated increase in volume, stresses occur in the steel of the steel beam, as a result of which the slides can flake off. Therefore, it is important to lower the amount of retained austenite. The first tempering of the steel beam is advantageous to convert residual austenite into martensite. Due to the heating of the steel of the steel beam during the first tempering, part of the carbon in supersaturated solution will precipitate out into austenite, causing the retained austenite to become less stable and transform to martensite during cooling after tempering. Martensite is not only very hard, but also very brittle. A second tempering is beneficial for reducing the brittleness of the steel of the steel beam. The tetragonality of martensite is hereby eliminated by the precipitation of carbides, which form cementite particles ($Fe_3C$) at higher temperatures, making the steel of the steel beam less brittle and therefore tougher, at the expense of a limited loss of hardness. Tempering the steel beam twice is beneficial to completely convert retained austenite to martensite, which increases the wear resistance of the slides, and to precipitate carbides from the steel beam, which makes the steel beam less brittle. After tempering, the steel beam cools down to an ambient temperature. The ambient temperature is preferably 20° C.±10° C.

Due to the hardening, internal stresses occur in the steel of the steel beam. This will cause the steel beam to warp. This is not desirable, and it is necessary to straighten the steel beam before performing the step of milling the at least partially continuous sawtooth profile on the first side of the steel beam in order to obtain an accurately manufactured slide. Straightening preferably takes place at a temperature of 20° C.±10° C., as this corresponds to an ambient temperature in which a perforating press is set up.

The sawtooth profile is milled according to the longitudinal direction of the steel beam. By at least partially continuous is meant that the sawtooth profile extends longitudinally over at least part of the length of the steel beam. The sawtooth profile is continuous over at least 50% of the length of the steel beam, preferably over at least 60% of the length of the steel beam, more preferably over at least 70% of the length of the steel beam, even more preferably over at least 80% of the length of the steel beam and even more preferably over at least 90% of the length of the steel beam.

A tooth of the sawtooth profile has two sides with a different slope. The sawtooth profile is comparable to the profile of a sawtooth roof (northlight roof). The sawtooth profile is advantageous for slides in a perforating press. A beam-shaped element is obtained by pointing two slides with their sawtooth profile towards each other and placing them on top of each other. By sliding the two slides relative to each other, a height of the beam-shaped element is adjusted. Punches of a perforating press are struck by the beam-shaped element. Depending on the height of the beam-shaped element, a punch may or may not be pressed through a metal plate and the metal plate may or may not be perforated. Surfaces of the sawtooth profile must be precisely finished so that the slides can slide relative to each other. The surfaces of the sawtooth profile must also be hardened so that when the punches of a perforating press are struck no indentations are formed in the said surfaces, as a result of which slides may no longer be able to slide properly relative to each other. In the long term, the indentations can also lead to damage and breakage of the slide. As previously described, the steel beam has been hardened in a vacuum furnace, so that the surfaces of the sawtooth profile are also hardened, and no oxidation has occurred on these surfaces and they can be finished smoothly.

After milling, the steel beam is hardened on the second side using induction currents. The second side is the side of a slide that contacts a punch. This side must therefore be able to withstand great pressures and a hammer effect during striking of the punch. Electric currents or induction currents are induced on the second side of the steel beam by means of electromagnetic coils. These induction currents generate heat locally in the steel beam. By reheating the steel beam on the second side, the steel beam on the second side is additionally hardened locally. It is not necessary to additionally harden the entire slide, as only the second side experiences the high pressures and the hammer effect. The full additional hardening of a slide is moreover disadvantageous because, as described above, although the formation of martensite makes the slide harder, it also makes it more brittle, as a result of which a slide would have a higher risk of breakage when used in a perforating press.

After additional hardening of the second side of the steel beam, the steel beam is again tempered twice. The steel beam is tempered at a temperature not exceeding 540° C. to convert residual austenite on the second side of the steel beam to martensite, to increase the wear resistance of the steel beam on the second side as previously described, and to prevent the second side of the steel beam from flaking during use. The tempering of the steel beam does not affect the rest of the steel beam, as the rest of the steel beam was not re-hardened, and no austenite was formed here.

During additional hardening with the aid of induction currents, tensions again occur in the steel beam, as a result of which the steel beam will warp. It is therefore necessary to straighten the steel beam to eliminate newly introduced deformations or deformations still present after hardening in the vacuum furnace. Straightening preferably takes place again at a temperature of 20° C.±10° C.

This method is particularly advantageous in that a slide is additionally hardened locally by means of induction currents on the second side, as a result of which the second side is sufficiently hard to withstand large local pressures and a hammer effect when striking the punch. It is not necessary to reinforce the slide on the second side with a hardened strip. As a result, it is also not necessary to drill holes in the slide, so that the slide is not locally weakened and the slide has a much smaller chance of breakage when perforating a metal plate.

In a preferred embodiment, steel of the steel beam comprises 0.70±0.10 wt % carbon, 0.20±0.05 wt % silicon, 0.50±0.10 wt % manganese, 5.00±0.50 wt % chromium, 2.30±0.25 wt % molybdenum and 0.50±0.10 wt % vanadium.

This specific grade of steel with an optimized alloy is particularly suitable for tool manufacturing. Steel reaches its highest hardness with a carbon content of just under 0.80 wt %. By using this steel grade, the slide is already more resistant to high local pressures and a hammer effect as standard.

According to a preferred embodiment, the steel beam is milled all around before hardening the steel beam in the vacuum furnace. Every surface of the steel beam is milled. Preferably at least a layer with a thickness of at least 500 μm is milled from each surface, more preferably at least 600 μm, even more preferably at least 700 μm and even more preferably at least 800 μm. The steel beam is milled all around to remove hammer scale. Hammer scale usually forms a 50 μm to 500 μm layer on a metal surface. Over time, hammer blow leads to corrosion due to the cathodic behavior of hammer scale in relation to steel, which shortens the life of a slide. Hammer scale also has a different coefficient of expansion than steel, which can cause cracks on the surface of the steel beam during hardening. Iron oxides also conduct heat much less well than steel. For example, iron oxide has a typical λ-value of 0.6 W/(m·K), while steel has a typical A-value of 41 W/(m·K). Hammer scale will expand even further in the steel of the steel beam when heated. The presence of hammer scale would therefore have a negative influence on the hardening of the steel beam in the vacuum furnace.

According to a preferred embodiment, tempering takes place after hardening of the steel beam in the vacuum furnace at a temperature of at least 620° C. and at most 650° C. and for a holding time of at least 90 minutes. Preferably, the temperature is at least 625° C., more preferably at least 630° C. Preferably, the temperature is at most 645° C., more preferably at most 640° C. As previously described, austenite will be converted to martensite during tempering. In this process, stresses disappear from the steel of the steel beam, the steel becomes tougher and loses limited hardness. At a temperature of at least 620° C. and at most 650° C., a desired hardness is obtained for the steel of the steel beam. At least 90 minutes, preferably at least 100 minutes, more preferably at least 110 minutes and even more preferably at least 120 minutes is necessary to heat the steel of the steel beam sufficiently to the core and to thus convert enough retained austenite into martensite. As previously described, the steel beam is tempered twice. It will be apparent that according to this embodiment, the steel beam is tempered twice with a holding time of at least 90 minutes.

According to a further embodiment, the steel beam after tempering has a hardness of at least 40 and at most 50 on the Rockwell C scale. Preferably, the steel beam after tempering has a hardness of at most 45 on the Rockwell C scale. The hardness is determined according to the standard ISO 6508-1:2016. A hardness of at least 40 is sufficient to prevent a slide from being damaged on the first side. A hardness of up to 50 is advantageous because it makes the steel beam sufficiently tough not to suffer a brittle fracture due to the hammer effect on the slides when perforating holes in a metal sheet.

According to a preferred embodiment, the steel beam is hardened in the furnace at a hardening temperature of at least 1000° C. and at most 1050° C. Preferably, the hardening temperature is at most 1040° C., more preferably at most 1030° C. Preferably, the hardening temperature is at least 1010°C, more preferably at least 1020° C. A temperature of at least 1000° C. is advantageous to make steel of the steel beam with a carbon content of less than 0.80 wt % austenitic. Here, atoms of the steel are stacked according to a face-centered cubic atomic lattice. As previously described, steel of the steel beam can be hardened by rapid cooling of an austenitic steel, whereby martensite is formed. A temperature above 1050° C. is energetically uninteresting, does not lead to a higher hardness of the steel and ensures more retained austenite.

According to a further embodiment, the steel beam is heated in the vacuum furnace from a temperature of 20° C.±10° C. to the hardening temperature over a period of at least 3 hours and at most 5 hours. By gradually heating the steel beam, the steel beam is uniformly heated deep into the steel, which causes less stress in the steel beam and less deformation of the steel beam. The steel beam, on the other hand, heats up sufficiently quickly to be able to carry out the hardening economically. Then, after the steel beam has reached the hardening temperature, the steel beam remains in the furnace at the hardening temperature, with a margin of ±10%, for at least 30 minutes and at most 4 hours. At least 30 minutes is necessary to make the steel beam austenitic.

After more than 4 hours, the atomic lattice of the steel of the steel beam still changes to a limited extent.

According to a preferred embodiment, the second side of the steel beam is tempered by means of induction currents at a temperature of at least 520° C. and at most 540° C. This not only converts the residual austenite on the second side of the steel beam into martensite, but also causes secondary hardening by precipitation of special carbides due to the presence of a high content of carbide-forming alloying elements, such as chromium and molybdenum. This embodiment is particularly advantageous in combination with a previously described embodiment in which the steel of the steel beam comprises 5.00±0.50 wt % chromium and 2.30±0.25 wt % molybdenum. This allows to achieve a hardness of at least 60 on the Rockwell C scale.

According to a further embodiment, when the second side of the steel beam is hardened by means of induction currents, a hardness of at least 60 on the Rockwell C scale is reached to a depth of at least 3 mm, measured from the second side. Preferably, the hardness is at most 65 on the Rockwell C scale.

The hardness is determined according to the standard ISO 6508-1:2016. A hardness of at least 60 is sufficient to prevent a slide on the second side from being damaged by high pressure on contact with a punch and by the hammer effect. A hardness of up to 65 is advantageous because it makes the second side of the steel beam sufficiently tough not to suffer a brittle fracture and break off a slide when perforating holes in a metal plate. The high pressure on contact with a punch occurs mainly near the surface on the second side of the steel beam, so that additional hardening to a depth of 3 mm is sufficient to absorb the high pressure on contact with a punch. Hardening deeper into the steel beam increases the volume of a slide which, although harder, is also more brittle, creating a risk of brittle fracture due to the high pressure on contact with a punch and the hammer effect.

According to a preferred embodiment, before applying the at least partially continuous sawtooth profile on the first side, all sides of the steel beam, with the exception of the first side, are finished smoothly. Said sides are smoothed by polishing or milling. A coating is preferably applied to said sides to prevent oxidation of the slide. The first side is not yet finished because after the second side is additionally hardened with the aid of induction currents, the steel beam is straightened a second time, which means that the sawtooth profile may not be entirely accurate and must be updated.

According to a preferred embodiment, when the at least partially continuous sawtooth profile is applied to the first side, at least 0.5 mm and at most 1.5 mm extra material remains on the sawtooth profile. The extra material is removed from the first side after hardening of the second side of the steel beam by means of induction currents during smooth finishing. As described above, during additional hardening with the aid of induction currents, tensions again occur in the steel beam, as a result of which the steel beam will warp, and the steel beam is therefore straightened a second time. As a result, the sawtooth profile may not be entirely accurate. By providing at least 0.5 mm extra material, the sawtooth profile can be accurately corrected when finishing the first side smoothly by removing the extra material. The first side is smoothed by polishing or milling. A coating is preferably applied to the first side to prevent oxidation of the slide.

According to a preferred embodiment, after the first straightening of the steel beam, the steel beam has a curvature along the longitudinal direction of the steel beam of at most 3 mm per meter. This is sufficient to apply the sawtooth profile to the steel beam quite accurately. A higher accuracy is not useful at this time because the additional hardening of the second side by means of induction currents again causes stresses to occur in the steel beam, as a result of which the steel beam will warp, after which the steel beam is straightened a second time. Any inaccuracies in the sawtooth profile on the first side can still be corrected after the second straightening, as previously described in an embodiment.

According to a preferred embodiment, after the second straightening, the steel beam has a curvature of at most 0.5 mm per meter along the longitudinal direction of the steel beam. This is particularly advantageous for an accurate change of the height of the beam-shaped element formed by two slides. This is important because, depending on the height of the beam-shaped element, a punch may or may not be pressed through a metal plate and the metal plate may or may not be perforated.

In a second aspect, the invention relates to a slide for a perforating press.

According to a preferred embodiment, the slide comprises a beam-shaped steel body. The beam-shaped steel body extends in a longitudinal direction. The beam-shaped steel body comprises on a first side an at least partially continuous sawtooth profile according to a longitudinal direction of the steel beam. By at least partially continuous is meant that the sawtooth profile extends longitudinally over at least part of the length of the steel beam. The sawtooth profile is continuous over at least 50% of the length of the steel beam, preferably over at least 60% of the length of the steel beam, more preferably over at least 70% of the length of the steel beam, even more preferably over at least 80% of the length of the steel beam and even more preferably over at least 90% of the length of the steel beam. A tooth of the sawtooth profile comprises two sides with a different slope. The sawtooth profile is comparable to the profile of a sawtooth roof (northlight roof).

The slide is hardened according to a method according to the first aspect.

This slide has the advantage, among other things, that the slide is additionally hardened on a second side, opposite the first side, with which the slide comes into contact with a punch, so that the slide is sufficiently hard to withstand large local pressures and a hammer effect when the punch is struck, without having to reinforce the slide on the second side with a hardened strip. This greatly reduces the risk of the slide breaking when perforating a metal plate.

The invention claimed is:
1. A method of hardening slides of a perforating press comprising:
   providing a steel beam;
   hardening of the steel beam in a vacuum furnace;
   tempering the steel beam twice;
   first straightening of the steel beam at a temperature of 20° C.±10° C.;
   milling of an at least partially continuous sawtooth profile, along a longitudinal direction of the steel beam, on a first side of the steel beam;
   wherein, after milling the at least partially continuous sawtooth profile on the first side of the steel beam, a second side of the steel beam, lying opposite the first side, is hardened by means of induction currents, after which the steel beam is again tempered twice and after which the steel beam is straightened a second time at a temperature of 20° C.±10° C.
2. The method according to claim 1, wherein steel of the steel beam comprises 0.70±0.10 wt % carbon, 0.20±0.05 wt

% silicon, 0.50±0.10 wt % manganese, 5.00±0.50 wt % chromium, 2.30±0.25 wt % molybdenum and 0.50±0.10 wt % vanadium.

3. The method according to claim 1, wherein before hardening the steel beam in the vacuum furnace, the steel beam is milled all around to remove hammer scale.

4. The method according to claim 1,
wherein after the hardening of the steel beam in the vacuum furnace and before the first straightening of the steel beam, the tempering of the steel beam twice is performed in a vacuum furnace at a temperature of at least 620° C. and at most 650° C. for a holding time of at least 90 minutes.

5. The method according to claim 4,
wherein after tempering the steel beam twice and before the first straightening of the steel beam, the steel beam has a hardness of at least 40 and at most 50 on the Rockwell C scale.

6. The method according to claim 1, wherein the steel beam is hardened in the vacuum furnace at a hardening temperature of at least 1000° C. and at most 1050° ° C.

7. The method according to claim 6, wherein the steel beam is heated in the vacuum furnace for a period of at least 3 hours and at most 5 hours from a temperature of 20° C.±10° C. to the hardening temperature, after which the steel beam after reaching of the hardening temperature remains in the furnace for at least 30 minutes at the hardening temperature±10%.

8. The method according to claim 1,
wherein after hardening the second side of the steel beam by means of induction currents, tempering the steel beam twice at a temperature of at least 520° C. and at most 540° C.

9. The method according to claim 8, wherein the second side of the steel beam, after tempering to a depth of at least 3 mm, measured from the second side, has a hardness of at least 60 on the Rockwell C scale.

10. The method according to claim 1, wherein all sides with the exception of the first side are finished smoothly before applying the at least partially continuous sawtooth profile to the first side.

11. The method according to claim 1, wherein when the at least partially continuous sawtooth profile is applied to the first side, at least 0.5 mm and at most 1.5 mm extra material remains on the sawtooth profile,
the method further comprising removing the extra material by smooth finishing, and wherein the removing of extra material is performed after the second side of the steel beam is hardened by means of induction currents.

12. The method according to claim 1, wherein after the first straightening of the steel beam, the steel beam has a curvature along the longitudinal direction of the steel beam of at most 3 mm per meter.

13. The method according to claim 1, wherein after the second straightening of the steel beam, the steel beam has a curvature along the longitudinal direction of at most 0.5 mm per meter of the steel beam.

* * * * *